United States Patent [19]
Adams et al.

[11] Patent Number: 6,148,127
[45] Date of Patent: Nov. 14, 2000

[54] TUNABLE DISPERSION COMPENSATOR AND OPTICAL SYSTEM COMPRISING SAME

[75] Inventors: Laura Ellen Adams, Basking Ridge; Benjamin John Eggleton, Berkeley Heights; Rolando Patricio Espindola, Chatham; Sungho Jin, Millington; Hareesh Mavoori, Berkeley Heights; John A. Rogers, New Providence; Thomas Andrew Strasser, Warren, all of N.J.

[73] Assignee: Lucent Technologies Inc., Murray Hill, N.J.

[21] Appl. No.: 09/159,178

[22] Filed: Sep. 23, 1998

[51] Int. Cl.⁷ ........................................................ G02B 6/34
[52] U.S. Cl. .............................. 385/37; 385/124; 359/130
[58] Field of Search ................................... 385/15, 24, 37, 385/123–124, 130; 359/130

[56] References Cited

U.S. PATENT DOCUMENTS

| | | | |
|---|---|---|---|
| 5,701,188 | 12/1997 | Shigematsu et al. | 359/161 |
| 5,982,963 | 11/1999 | Feng et al. | 385/37 |
| 5,999,546 | 12/1999 | Espindola et al. | 372/20 |
| 5,999,671 | 12/1999 | Jin et al. | 385/37 |
| 6,055,348 | 4/2000 | Jin et al. | 385/37 |

OTHER PUBLICATIONS

Feng et al., "Tunable nonlinearly–chirped fiber Bragg grating for use as a dispersion compensator with a voltage–controlled dispersion", Optical Fiber Communication Conference and Exhibit, 1998. OFC' Fe. 1998, Technical Digest, pp. 72–74.

*Primary Examiner*—John D. Lee
*Assistant Examiner*—Michelle R. Connelly-Cushwa
*Attorney, Agent, or Firm*—Mathews, Collins, Shepherd & Gould, P.A.

[57] ABSTRACT

A tunable chromatic dispersion compensator for optical communication systems is disclosed. An optical grating, such as a fiber Bragg grating, nonchirped, linearly chirped or non-linearly chirped, is strained to alter the dispersion compensator characteristics, preferably with a gradient-generating body bonded onto the length of the fiber grating. The body may be latchably strained so that the grating characteristics may be changed or tuned while avoiding use of a continuous power supply. Various optical networking applications using such dispersion compensating devices are also disclosed.

19 Claims, 8 Drawing Sheets

TUNABLE DISPERSION COMPENSATOR AND OPTICAL SYSTEM COMPRISING SAME

RELATED APPLICATIONS

This case is related to U.S. patent application Ser. No. 09/159,907, filed Sep. 24, 1998, and U.S. patent application Ser. No. 09/158,672, filed Sep. 22, 1998, now U.S. Pat. No. 5,999,546, having common inventors hereto and assigned to the present assignee.

FIELD OF THE INVENTION

This invention relates to a chromatic dispersion compensator and more particularly, to a dispersion compensator device that may be latchably tuned. The invention further comprises an optical communication system containing the inventive compensator device.

BACKGROUND OF THE INVENTION

Optical fibers and fiber gratings are useful for telecommunication transmission and networking. In long-distance transmission of optical signals, the accumulation of signal dispersion may be a serious problem. This problem intensifies with an increase in the distance the signals travel and the number of channels in a wavelength-division-multiplexed (WDM) optical communication system. Efforts to compensate for chromatic dispersion to date have involved use of dispersion compensating fibers, dispersion compensating gratings, or a combination of both. See M. I. Hayee et al., IEEE PHOTONICS TECHNOLOGY LETT., Vol. 9, No. 9, p. 1271 (1997); R. I. Laming et al., IEEE PHOTONICS TECHNOLOGY LETT., Vol. 8, No. 3 (1996); W. H. Loh et al., IEEE PHOTONICS TECHNOLOGY LETT., Vol. 8, No. 7 (1996); K. O. Hill et al., OPT. LETT., Vol. 19, p. 1314 (1994); and U.S. Pat. No. 5,701,188 issued to M. Shigematsu et al., on Dec. 23, 1997, incorporated herein by reference.

The above-mentioned dispersion compensating devices, however, are not flexible and provide only a fixed degree of compensation for chromatic dispersion. Those concerned with technologies involving optical communications systems continue to search or new designs enabling for more flexible methods for compensating for chromatic dispersion. It is desirable to have a tunable dispersion compensator whose characteristics and performance may be selectively altered and that does not require a continuous use of power. This invention discloses such a tunable dispersion compensator and optical communication systems comprising such a compensator.

SUMMARY OF THE INVENTION

Summarily described, the invention embraces a tunable dispersion compensator device comprising a length of waveguide having a grating region, a body attached to the waveguide proximal the grating region, and a component for inducing an elastic strain in the body. The elastic strain in the body causes an adjustment in the grating region, e.g., in the spacings between the grating elements, to alter the dispersion compensating characteristics of the waveguide. The grating may be a Bragg grating, and a non-chirped or chirped grating. Advantageously, where a non-chirped grating is used, the body comprises a gradient-generating body so that when the component induces a uniform elastic strain, the grating is altered to become a chirped grating. The component for inducing the strain preferably comprises magnets disposed alongside the fiber. Many embodiments and applications are contemplated, including dispersion compensator modules, amplifiers, and WDM systems.

BRIEF DESCRIPTION OF THE DRAWINGS

The advantages, nature and additional features of the invention will appear more fully upon considering the illustrative embodiments described in the accompanying drawings. In the drawings.

It is to be understood that these drawings are for purposes of illustrating the concepts of the invention and are not to scale.

DETAILED DESCRIPTION OF THE INVENTION

Figure 1A:
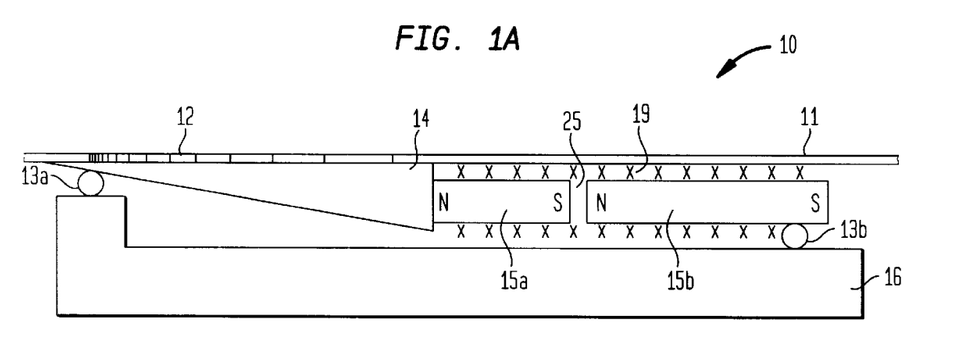
FIGS. 1A–1C schematically illustrate exemplary embodiments of the inventive dispersion compensator.
Figure 1B:
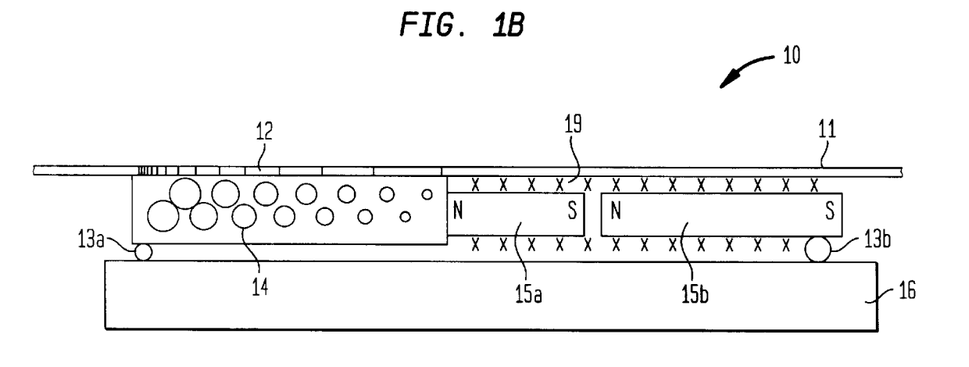
Figure 1C:
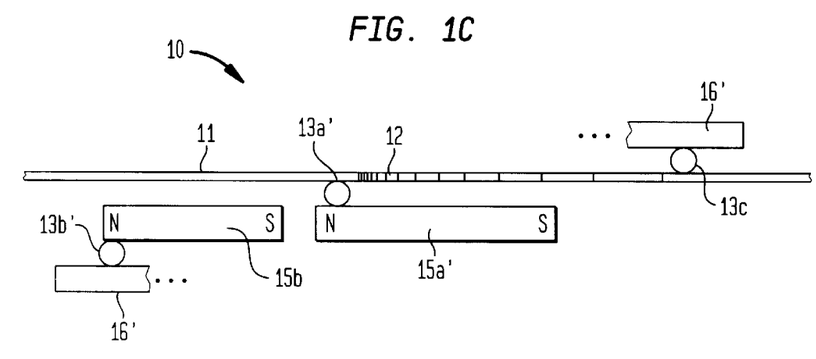

Referring to the drawings, FIGS. 1A–1C illustrate exemplary embodiments of the inventive dispersion compensator 10. The compensator comprises a length of waveguide, such as an optical fiber 11, a grating region 12 in the waveguide, a body 14 attached to the waveguide at the grating region 12, and a component (e.g., 15a, 15b), for inducing strain in the body. In FIGS. 1A–1C, a magnetically-induced strain is applied. Other types of forces may be used, such as mechanically-induced force described further below, and as are known. In the embodiment of FIGS. 1A–1C, first and second magnetic components 15a, 15b, are attracted to or repelled from each other to induce elastic strain in the body 14 bonded to the fiber at the grating region. Although the grating region 12 is shown in FIGS. 1A–1C as having unequally-spaced perturbations, initially before operation of the compensator device the grating region 12 may comprise grating elements of substantially equally-spaced index perturbations, slits, or grooves. Grating regions as are known in the field may be used, including Bragg gratings, long-period gratings, diffraction gratings, or chirped gratings.

In FIGS. 1A–1B, the fiber 11 is bonded along the length of the grating region 12 to and along the length of the body which also is a gradient-generating body 14. Due to a gradient in the body 14, when the body is subjected to a uniform strain, such as a tensile or compressive strain, the body in turn induces a non-uniform strain on the fiber to cause a non-uniform change in the grating periodicity and chirping. The gradient in the body may be a dimensional gradient, e.g., due to a geometric gradient in the diameter, thickness or width of the body as shown in FIG. 1A, or a porosity gradient, e.g., due to perforations varying in some degree (e.g., in a gradient manner by size, extent, or distribution), along the length of the body, as illustrated in FIG. 1B. Alternatively, the gradient may be what is referred to herein as a chemistry gradient, meaning a gradient in atomic mix ratio of elements comprising the body, which in turn creates a property gradient, such as an elastic modulus of the body. It should be understood more than one body may be used.

When a gradient-generating body is used as in FIGS. 1A–1B, a non-uniform strain is induced in the fiber grating which may create a chirped (linearly or non-linearly chirped) grating structure from an originally non-chirped grating. Alternatively, the fiber grating in the inventive embodiment can be a pre-chirped grating (linearly, non-linearly, or any-pattern chirped). The non-uniform strain provided by the inventive device in that case can further increase the slope of the chirping gradient along the length of the grating. Also, it should be understood that although FIGS. 1A–1C show a single grating region, multiple-in-series gratings may be used and strained simultaneously with one compensator device according to the invention.

Referring to FIGS. 1A–1B which involve gradient straining, the first magnet 15a (also referred to herein as the mobile magnet), is attached to the gradient-generating body 14. This attachment may be formed with use of epoxy, solder, brazing, welding, glass adhesives, mechanical clamping, mechanical hooks, or other attachment methods or devices as are known. At least a second magnet 15b (also referred to herein as the immobile magnet), is placed with one of its poles proximal that of the first magnet 15a. It should be understood that more than one mobile or immobile magnet also may be used in combination. The immobile magnet 15b is bonded or attached to a supporting fixture 16 which can optionally also serve as a guiding tube for movement of the body 14, which is illustrated in FIG. 1A. The gradient-generating body 14 preferably also is bonded onto a supporting fixture which may be the same supporting fixture 16 holding the immobile magnet 15b. For example, in FIGS. 1A–1B, the fixture 16 is shown secured to the body 14 at one end (e.g., the left end), at attachment point 13a, and it is shown secured to the immobile magnet at the other end (e.g., the right end), at attachment point 13b. The fixture 16 may be made in various shapes and sizes, and the L-shaped member of FIG. 1A or the tube or channel configuration of FIG. 1B are merely exemplary. The fixture may guide the movement of the mobile magnet and protect the assembly or simply be a block of solid material.

At least one solenoid 19 with conductive wire windings may be disposed adjacent or preferably, around the first or second magnet or both so that a magnetic field can be generated when a current is passed into it. The solenoid may be a single solenoid, or it may be split into two or more segments, and if desired, independent controls may be used for enhancing control over the magnetic field generated. The magnetic moments induced in the magnets create an attractive (or repulsive) force between their mating poles which causes a tensile (or compressive) strain in the gradient-generating body 14 and attached fiber grating 12.

Exemplary advantageous materials for fabricating the gradient-generating body 14 include glass, ceramic, metal, or composite materials. For example, the fiber grating itself is typically fabricated with silica glass, and the same material may be used to fabricate the body 14, which then may be bonded onto one side of or around the grating.

Alternatively, using silica glass, the gradient-generating body may be integrally formed with the optical fiber, for example, the fiber can be shaped so that it has a variable diameter to form a geometric gradient, and the grating structure can be written into the fiber at the region of this geometric gradient either before or after the fiber is fabricated. Metals and alloys also advantageously may be used to form the gradient-generating body, as they may be easily fabricated into gradient structures of variable widths or thicknesses and then bonded onto the fiber at the grating region with adhesives, such as glass adhesives (e.g., low melting point glass), epoxy, or by solder bonding. Another advantageous approach for forming the gradient-generating structure involves depositing onto the surface of the fiber at the grating region metallic or ceramic coatings having a desired thickness or property gradient. Various physical or chemical processing methods may be used to deposit the materials, including sputtering, evaporation, chemical vapor deposition, electrodeposition, electroless deposition, and dip-coating, or substractive methods such as etching, gradient-porous etching of deposited material, and the like.

A gradient straining of the grating such as achieved with the devices of FIGS. 1A and 1B is preferred. However, a dispersion compensator device may be formed according to the invention with non-gradient straining of the fiber, which is illustrated in FIG. 1C. In this embodiment, a mobile magnet 15a' is attached directly to the fiber adjacent the grating region at bond region 13a40 and comprises the body for inducing strain in the fiber. An immobile magnet 15b is attached to a fixed substrate 16' or guiding rail at bond region 13b' and comprises the component for inducing strain in the grating attached to the body 15a'. The fiber 11 may at a separate point of attachment 13c also be secured to the guiding rail 16.' Here, the body 15a' induces a shift in wavelength distribution which can be useful for some dispersion compensating applications, such as where a pre-chirped grating is used.

Figure 2A:
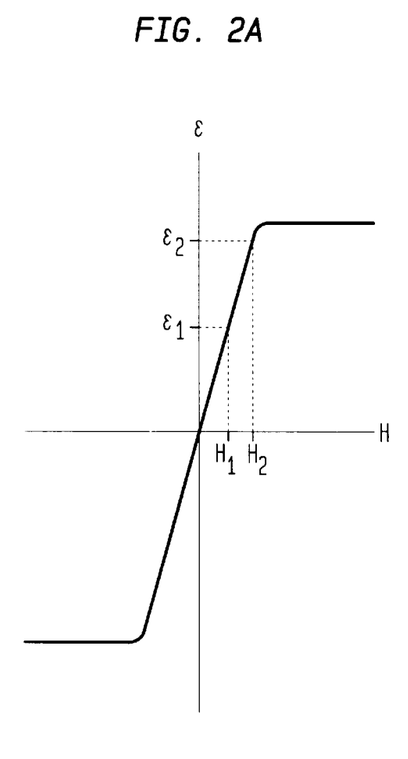
FIGS. 2A–2B are graphs illustrating the effects of non-latchable (FIG. 2A) and latchable (FIG. 2B) strain induced by magnetic field actuation in an inventive dispersion compensator.
Figure 2B:
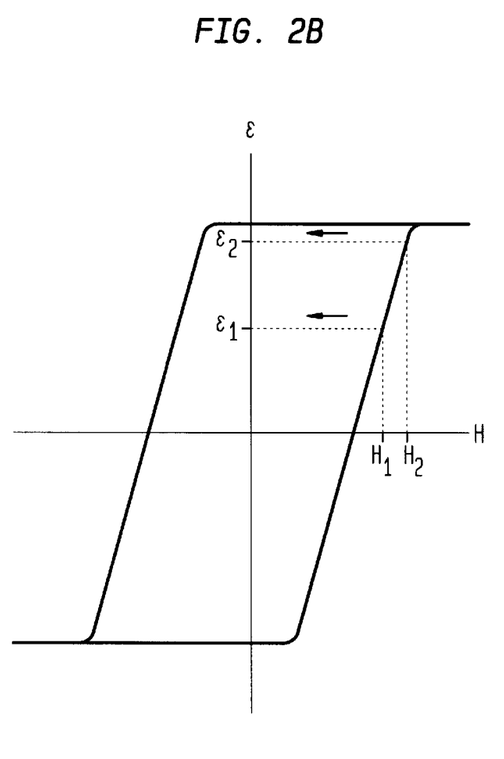

The compensator device may be fabricated so that the strain is latchable or non-latchable. Where a non-latchable strain is desired, advantageously soft-magnetic materials may be used to fabricate the magnetic components, and the dispersion-compensating characteristics of the inventive device may be frequently and temporarily (e.g., for a short duration) changed. If the magnetic field is increased by increasing the electrical current in the solenoid, the strain in the grating may increase, at least a certain peak level of strain is reached. When the applied field in the solenoid is reduced or removed, the strain in the dispersion compensating grating also may be reduced or removed. FIG. 2A, for example, illustrates the use of non-latchable strain for applied magnetic fields $H_1$ and $H_2$ and the corresponding induced strains on the dispersion compensating grating, $\epsilon_1$ and $\epsilon_2$.

Where latchable strain is desired, at least one or both of the magnetic components 15a, 15b, may be made of programmable semi-hard magnetic material with an intermediate coercivity ($H_c$) to provide a relatively square magnetic-hysteresis loop, illustrated in FIG. 2B. Where only one magnetic component is made with programmable magnetic material, the other component may be made with magnetically soft material, for example, with low coercivity ($H_c$) of less than about 20 Oe. Such materials include Ni—Fe permalloy or Si-steel. Alternatively, the other (non-programmable) component may be made with a magnetically hard material having a high coercivity $H_c$ of more than about 500 Oe, such as Nd—Fe—B, Sm—Co, or Ba-ferrite materials. Preferred magnetic materials for fabricating a latchable dispersion compensator device are those whose magnetic properties are modifiable by a pulse magnetic field. Suitable materials include Fe—Cr—Co, Fe—Al—Ni—Co (Alnico), Cu—Ni—Fe (Cunife), Co—Fe—V (Vicalloy), specially-processed, low-coercivity ($H_c$) rare-earth cobalt Sm—Co or Nd—Fe—B, and Ba-ferrite or Sr-ferrite materials. A preferred range of coercivity for a programmable magnet is below about 500 Oe and more preferably below about 100 Oe for ease of programming by re-magnetization using a solenoid pulse field. The coercivity typically is above about 10 Oe and preferably above 30 Oe for maintaining the stability of the remanent magnetization and stability against demagnetization due to stray magnetic fields. A non-programmable magnet may be used as a mobile magnet, for example, in combination with a stationary programmable magnet.

To maximize the magnetic force, the gap 25 (FIG. 1A), between the facing magnets 15a, 15b, should be small, since the magnetic force decreases as the size of the gap increases. Preferably, the gap is less than about 80 mil, and more preferably less than about 20 mil, and even more preferably less than about 10 mil. For satisfactory latching when the field is removed, the programmable magnet should have a square magnetization-hysteresis loop ("M-H loop") with a squareness ratio (remanent magnetization to saturation magnetization) of at least about 0.85, preferably at least 0.90, even more preferably at least 0.95. For ease of control, the loop is desirably skewed by at least about 50% of $H_c$. Intentional skewing of an M-H loop is described, for example, in U.S. patent application Ser. No. 09/020,206, filed Feb. 6, 1998 by Espindola et al., assigned to the present assignee and incorporated herein by reference. Mechanically ductile and easily malleable or machinable magnet alloys such as Fe—Cr—Co, Cu—Ni—Fe, or Co—Fe—V are particularly advantageous for they may be shaped into desired geometries, such as the rod-like or tube-like geometries shown in FIGS. 1A–1C. Stable permanent magnets with high coercive forces (e.g., where the coercivity is greater than about 1000 Oe), such as Sm—Co or Nd—Fe—B, are less preferred (unless modified to exhibit lower coercive forces) due to difficulties in reprogramming remanent magnetization.

An Fe-28% Cr-7% Co alloy may be deformation-aged to yield a square M-H loop with $H_c$ of 70 Oe, a dimension of about 0.180" in diameter and 4" in length. Where the M-H loop is skewed by about ~60 Oe, a M-H loop similar to that shown in FIG. 2B is produced. For applied magnetic fields of $H_1$ and $H_2$, the corresponding magnetization is latchably retained after the field is removed, and the corresponding separation between the two magnets and the induced strains on the dispersion compensating grating, $\epsilon_1$ and $\epsilon_2$, are also latchably retained. With the latching, the device may be operated without a continuous supply of power. To vary the degree of tuning, the strain induced in the grating by the gradient-generating body may be altered and latched by changing the magnetization in the programmable magnets. This can be achieved by either increasing the applied field or by demagnetizing and remagnetizing one or more of the magnets to a new field level. For magnetization of the magnets using a solenoid, a pulse field (a pulse current in the solenoid) can conveniently be used for high-speed, low-power operation of the device. A preferred duration or speed of the pulse field is in the range of about 10 to $10^{-6}$ seconds, and more preferably about $10^{-1}$ to $10^{-4}$ seconds. The current pulse may have various shapes including sinusoidal, rectangular, trapezoidal, triangular, and irregular.

Figure 3:
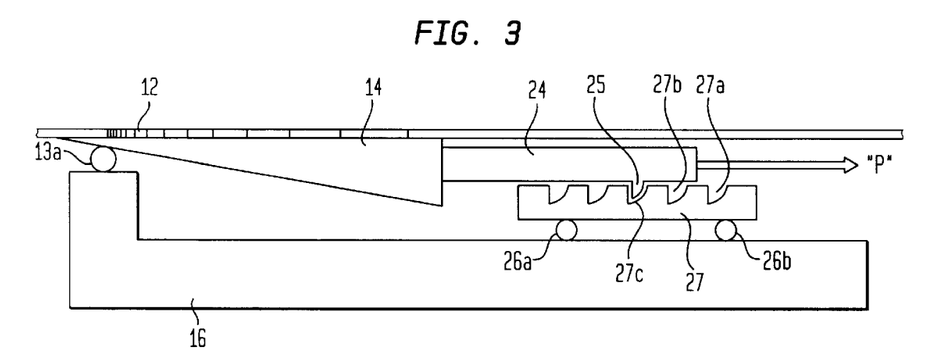
FIG. 3 is an alternative embodiment of the inventive compensator applying mechanically-induced strain.

FIG. 3 shows an alternative embodiment of the inventive compensator using mechanically-induced force. An extension arm 24 is attached to the body 14, which in this embodiment is shown as a gradient-generating body. The arm 24 in turn is coupled to a source for applying a mechanical force (not shown), for pulling the arm 24 and attached body 14 following arrow "P". The mechanical pull may be provided by various sources including a motor-driven mechanism, spring-driven mechanism, solenoid-core driven mechanism analogous to an LVDT (linear variable differential transformer), and an electrically-actuated magnetic force mechanism. Pneumatic or hydraulic forces and devices for supplying same also may be used. The mechanical force may be made latchable which is advantageous for avoiding a continuous power supply. In FIG. 3, the latching is formed by the underside of the arm having a locking tooth 25 which operates in conjunction with a stepped latching bar 27 which is fixedly secured, e.g., at bond regions 26a, 26b, to the substrate 16. The bar has a plurality of notches 27a, 27b, 27c, disposed therein corresponding substantially in dimension to the locking tooth 25 so that as the arm is mechanically pulled to produce the desired amount of strain, and the tooth will become lodged in a notch (e.g., shown at 27c), to hold the arm and gradient-generating body 14 in place. Other devices also are contemplated for latching the mechanical force and component, such as a spring-lock mechanism, ratchet, rotating gear, or the like, as are known.

The following is an Example representing a specific embodiment which is intended to be exemplary to aid in understanding the invention and not limiting in nature.

EXAMPLE 1

An apodized fiber Bragg grating (approximately five centimeters long with a reflection peak at about 1553 nm), was written into the core of a photosensitive optical fiber using a phase-mask scanning technique. The outer polymer layer of the fiber was stripped from the section of the fiber containing the grating. The fiber grating was then mounted on an automated rotation stage and placed in an electron-beam evaporator. Titanium (~100 Å as an adhesion promoter), and gold (~1500 Å) were evaporated onto the fiber while it was rotating to form a uniform coating of metal on the outer surface at the stripped region. Fine wires were attached to the ends of the stripped section with silver epoxy to provide an electrical connection for the deposition of silver. The fiber was placed in an electroplating bath for plating at constant current, and while plating, it was pulled from the bath with a programmable translation stage to produce a controlled variation in the thickness of the silver for forming a gradient. The electrodeposition was performed at room temperature on the grating segment of the fiber at a constant current of ~1.5 mA. The fiber was pulled from the bath at a constant rate of ~12 mm/min; for each sample, the deposition was repeated four or five times to increase the thickness of the silver. The thickness gradient in the tapered metal coating was linear along the length of the grating with the coating thickness being about 5 micrometers at one end and about 30 micrometers at the other end to define an integrally-formed gradient-generating body.

Figure 4:
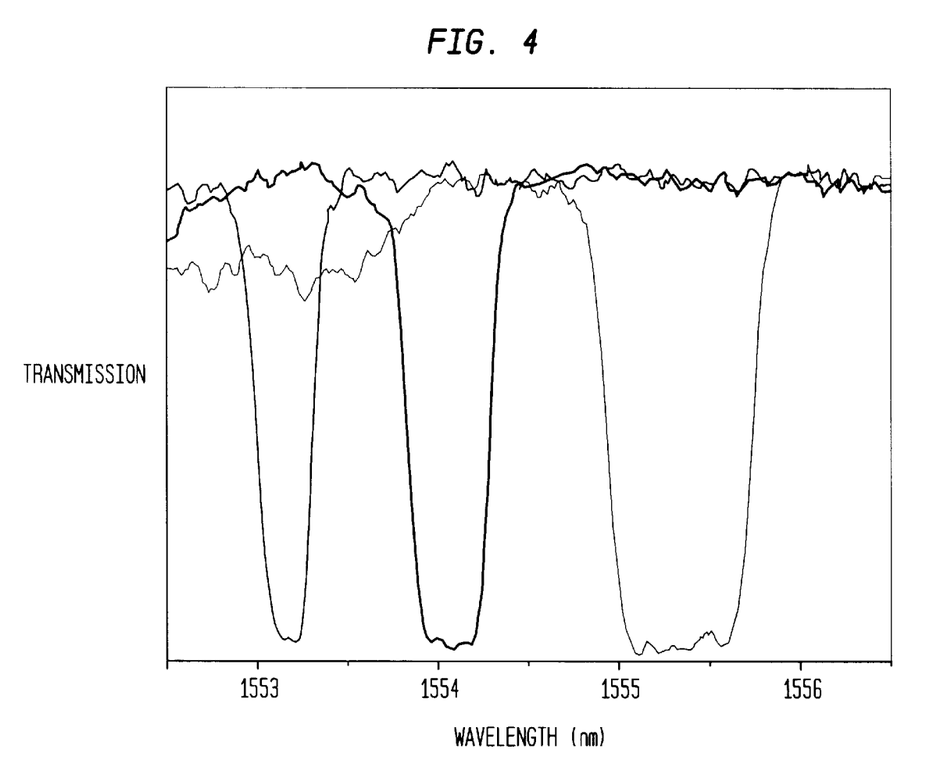
FIG. 4 represents experimental data for transmission as a function of wavelength for a non-chirped grating that has been altered to a chirped grating by a compensator device having a gradient-generating body.

A tensile force was applied to the gradient-generating body, and the center wavelength of the grating (originally about 1553.13 nm), was shifted by about 1 nm and 2 nm, which is illustrated in FIG. 4. Looking at FIG. 4, it is evident that a grating-chirping effect was induced due to the presence of the thickness gradient. As the tensile strain was applied, the transmission spectrum of the fiber Bragg grating was substantially broadened (chirped), and the extent of broadening was increased with increasing tension.

Figure 5A:
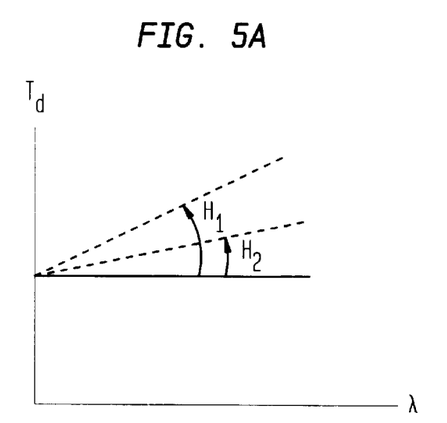
FIGS. 5A–5E are graphs illustrating types of dispersion tuning that may be achieved with the inventive dispersion compensator.
Figure 5B:
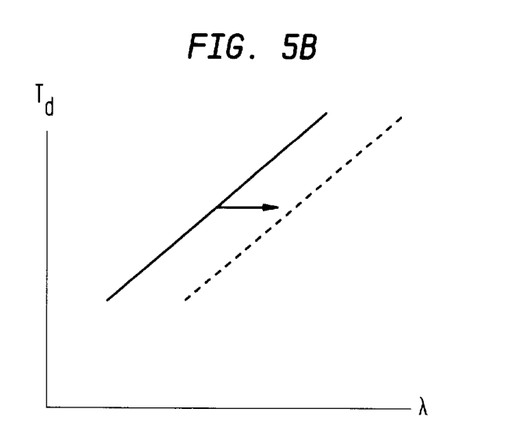
Figure 5C:
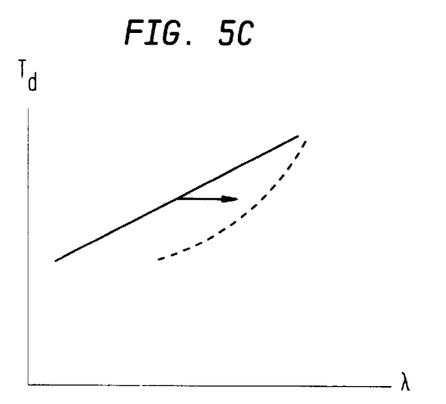
Figure 5D:
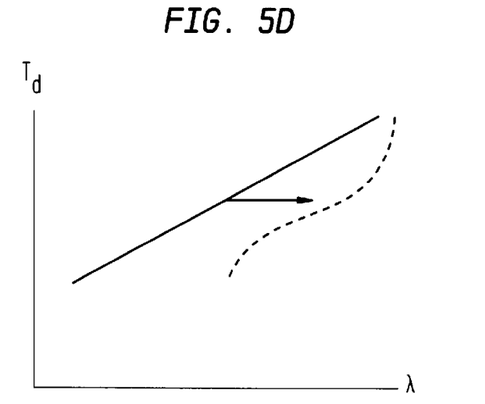
Figure 5E:
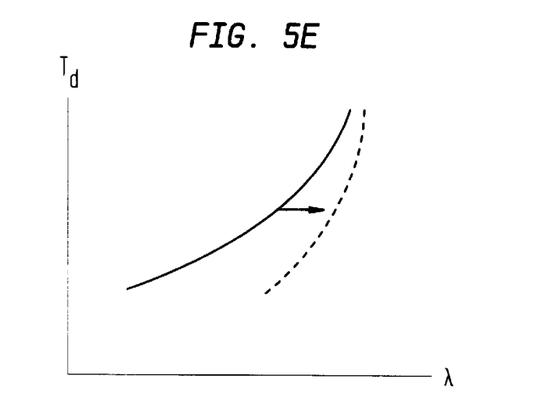

FIGS. 5A–5E are plots of the time delay characteristics $T_d$ (which is a measure of wavelength dispersion) as a function of wavelength λ for different embodiments of the inventive compensator device, using different grating regions. These plots illustrate various capabilities of the inventive device in terms of altering the chromatic dispersion characteristics. FIG. 5A plots data where a nonchirped grating is used and strained using the gradient-generating body to form a chirped grating (e.g., as in FIGS. 1A–1B). The slope, $T_d$ (time delay)/λ (wavelength), may be adjusted by changing the applied actuation field and hence the latchable movement of the mobile magnet (e.g., 15a, FIGS. 1A–1B). FIG. 5B shows the translational shift of the $T_d$-λ curve where strain has been induced in a uniformly (linearly) chirped grating. FIGS. 5C and 5D illustrate the effects of an embodiment where a linearly chirped dispersion compensating grating is used and strained to exhibit the characteristics of a nonlinear chirped grating. FIG. 5E reflects use of a non-linearly chirped grating which has been made more nonlinear. There are particular advantages as to each of these embodiments depending on the types and the extent of dispersion to be compensated, as should be apparent to one skilled in the field.

Figure 6:
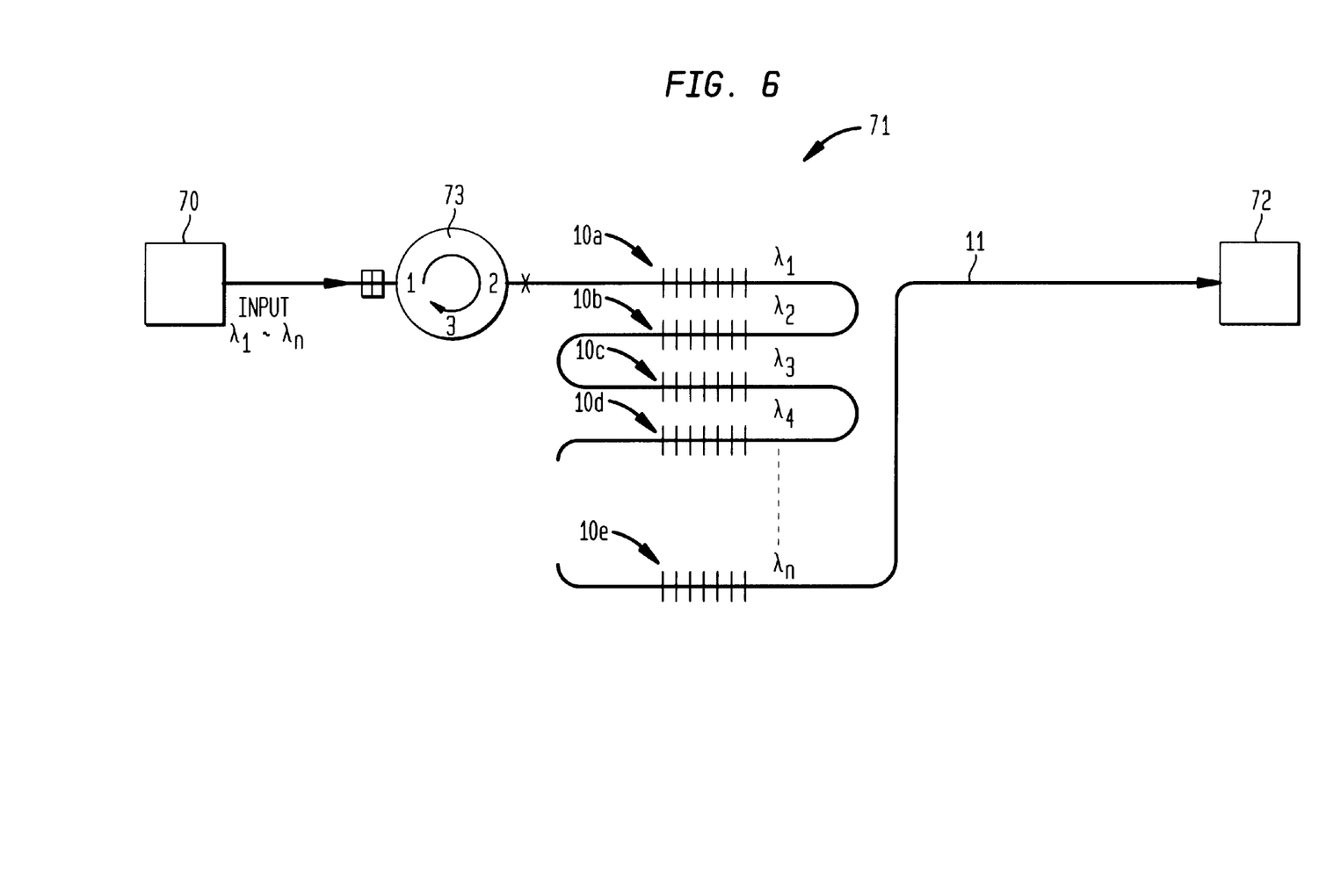
FIG. 6 schematically illustrates a dispersion-compensator assembly for an n-channel WDM communication system.

In FIG. 6, an example of a wavelength division multiplexed (WDM) communications system is schematically illustrated comprising a transmitter 70, an improved N-channel multiplexer/demultiplexer 71, and a receiver 72, all connected by trunk fiber 11. The input to the fiber 11 from the source 70 consists of optical signals at several wavelengths, $\lambda_1$ to $\lambda_n$. The improved multiplexer 71 comprises at least one circulator 73 and a series of independently tunable dispersion compensating fiber gratings (10a, 10b, 10c, 10d, 10e), each of which may be nonchirped, linearly-chirped or non-linearly chirped. Since the inventive dispersion compensator is capable of having a broad bandwidth, each dispersion compensator can compensate for a few to several channels, and the total number of the tunable dispersion compensators used in the system can be substantially reduced as compared with previous systems.

Figure 7:
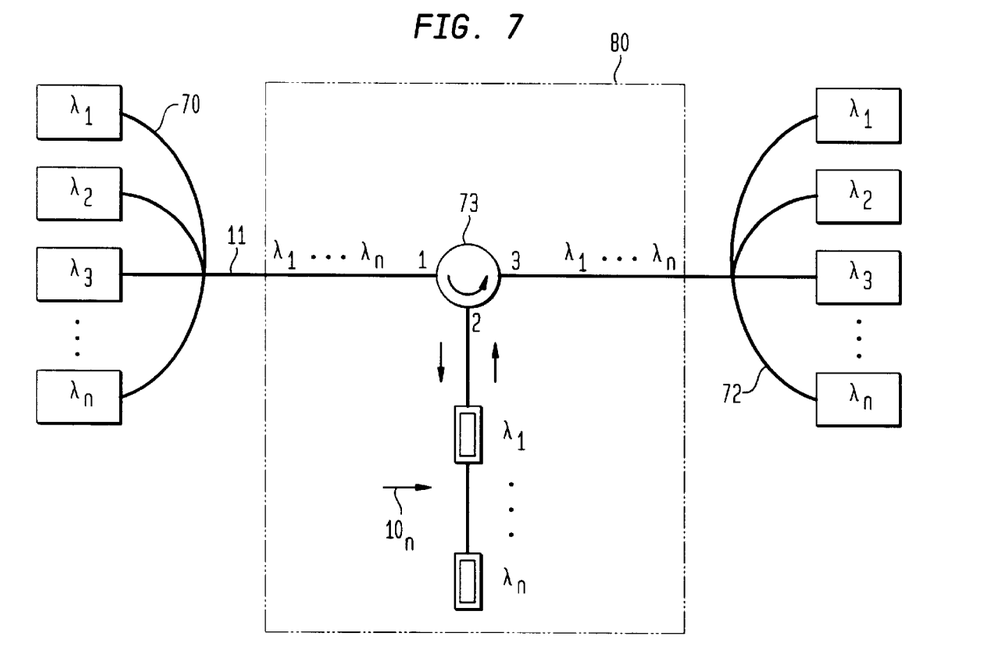
FIGS. 7–10 schematically illustrate optical communication systems comprising the inventive tunable dispersion-compensator.

FIGS. 7–10 schematically illustrate optical communication systems comprising inventive tunable dispersion-compensating devices. In FIG. 7, a dispersion compensating module (DCM) at boxed region 80 comprises an optical circulator and a total of "n" number of independently tunable dispersion-compensating gratings 10n. The order in which the gratings may be placed in the module depends on the chromatic dispersion that has accumulated in the system before reaching the DCM. For example, if the accumulated dispersion ($A_D$) for channel 1 at $\lambda_1$ is greater than that of channel n at $\lambda_n$ ($A_D\lambda_1 > A_D\lambda_n$), then the gratings are arranged in the order shown, i.e., the first compensating grating of the DCM is at $\lambda_1$ and the last is at $\lambda_n$. If the accumulated dispersion for channel 1 at $\lambda_1$ is less than that of channel n at $\lambda_n$ ($A_D\lambda_1 < A_D\lambda_n$), then the gratings are arranged in the reverse order shown, i.e., the first compensating grating of the DCM is at $\lambda_n$ and the last is at $\lambda_1$. This DCM may comprise part of a dense WDM system (DWDM), further comprising a multi-wavelength transmitter 70, a length of optical fiber 11, and a multi-wavelength receiver 72.

Alternatively to the embodiment of FIG. 7, the DCM may comprise a single tunable dispersion compensating chirped fiber grating, as previously described, in place of the "n" number of independently tunable dispersion-compensating gratings 10n. In this case, the direction of the chirped gratings will depend on the accumulated chromatic dispersion, i.e., if at channel 1 $A_D\lambda_1 > A_D\lambda_n$, then the chirped fiber grating is disposed such that at the point of entry, the grating is at $\lambda_1$, but if at channel 1 $A_D\lambda_1 < A_D\lambda_n$, the chirped fiber grating is disposed such that at the point of entry, the grating is at $\lambda_n$.

Figure 8:
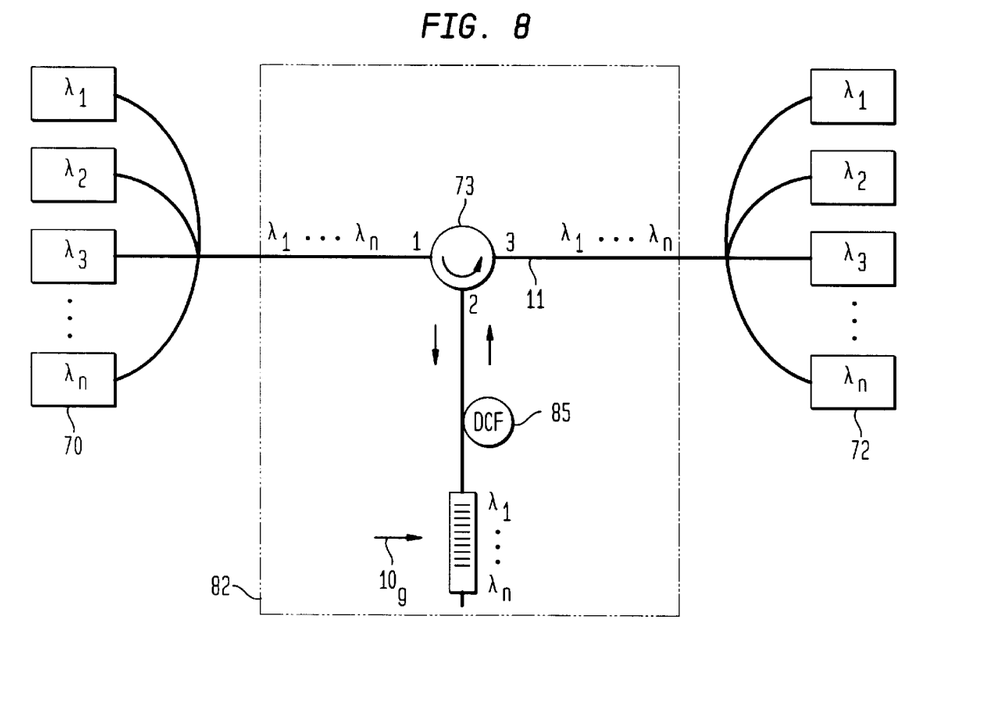

FIG. 8 schematically illustrates a system where a DCM 82 comprises an optical circulator 73, a length of dispersion compensating fiber (DCF) 85, and a single tunable dispersion compensating chirped fiber grating 10g. Alternatively to the single chirped grating device 10g, a plurality or n-number of independently tunable dispersion compensating gratings may be used (e.g., the n-number of gratings 10n of FIG. 7 may be substituted for the single chirped grating 10g of FIG. 8). In this case, the majority of the chromatic dispersion compensation is performed by the DCF 85. The remanent chromatic dispersion in each channel, due to a dispersion slope mismatch between the ideal compensator and the DCF, is compensated using the compensating chirped grating 10g (or the n-number of independently tunable dispersion compensating gratings 10n). The same principles described above with reference to FIG. 7 relating to the direction of the chirped dispersion grating 10g or the order of the n-number of gratings 10n apply with regard to the embodiment of FIG. 8. Also as in FIG. 7, this DCM 82 may comprise part of a DWDM further comprising a multi-wavelength transmitter 70, a length of optical fiber 11, and a multi-wavelength receiver 72.

Figure 9:
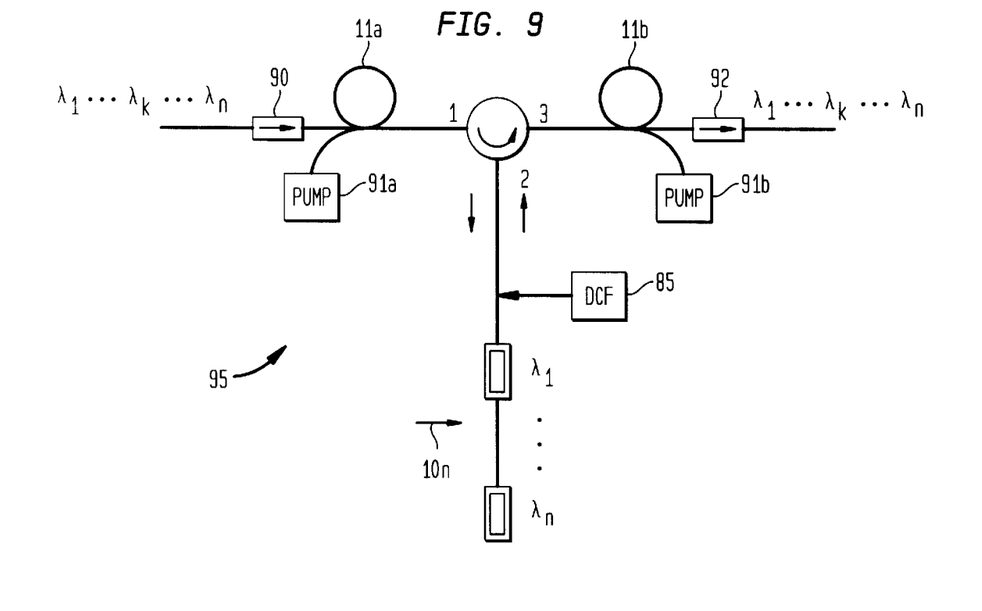
Figure 10:
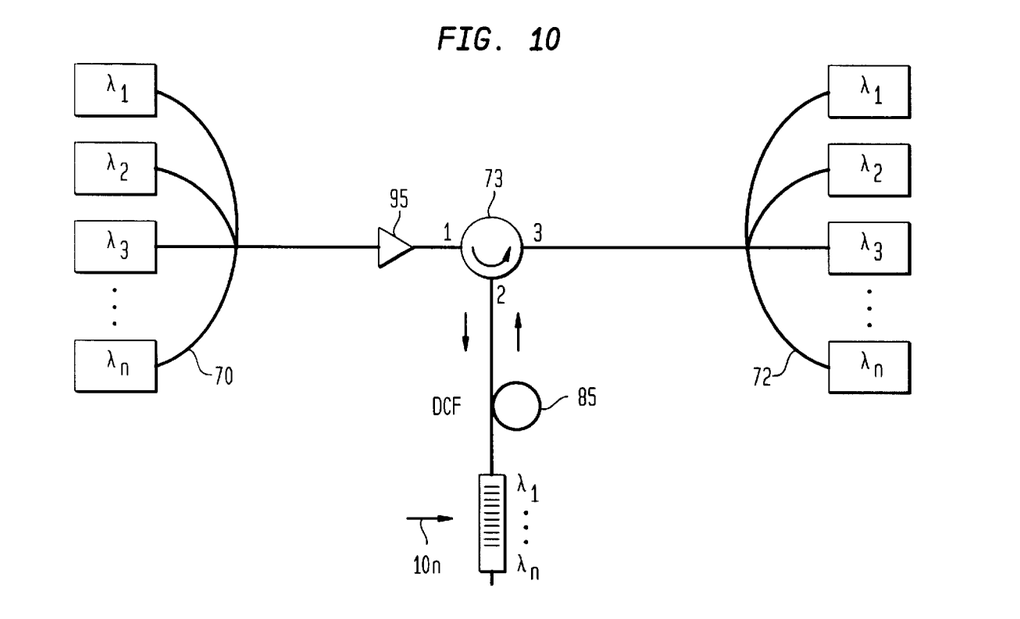

FIG. 9 schematically shows an amplifier 95 having a dispersion compensating module. The amplifier comprises an input isolator 90, a first length of rare-earth doped fiber 11a, a first pump 91a for optical pumping the first length of fiber 11a, a second length of rare-earth doped fiber 11b, a second pump 91b for optical pumping the second length of fiber 11b, an output isolator 92, a circulator 73, and "n" number of independently tunable dispersion-compensating gratings 10n. The optical amplifier provides the advantage that it not only compensates for chromatic dispersion, but it also amplifies the signals to offset losses introduced by the tunable compensator. Optionally, a dispersion compensating fiber 85 may be used in this amplifier assembly, similarly to FIG. 8. FIG. 10 schematically illustrates a DWDM comprising a multi-wavelength transmitter 70, a length of optical fiber 11, an amplifier 95 which may comprise the amplifier of FIG. 9 containing the DCM, a DCM, and a multi-wavelength receiver 72, where the DCM comprises an optical circulator 73, an optional length of dispersion compensating fiber (DCF) 85, and a series of tunable dispersion compensating fiber gratings 10n.

The grating-based dispersion compensator of this invention may be operated in a reflective mode, together with a circulator, as shown in the above-described embodiments. However, an alternative arrangement is to use the grating in the transmission mode rather than the reflective mode. In this case, preferably the grating is unchirped and apodized, and the dispersion exists close to the edge of the stop band where the transmission is high. Thus, dispersion is provided for the pass channel rather than for the reflected channel and a circulator may be avoided. By applying a constant tension to the grating, for example, by use of a magnetic component, the central wavelength of the grating may be shifted. This changes the magnitude of the dispersion for the adjacent channel and thus provides a means for adjusting the dispersion of the grating. Another approach for operating the compensator in the transmission mode, avoiding use of the circulator, is to induce chirping in the grating, e.g. as previously described. In this case, the chirping and resultant broadening of the grating spectrum approaches the adjacent channel, thus causing the dispersion property to be altered without shifting the central wavelength.

It is to be understood that the above mentioned embodiments are illustrative of only a few of many embodiments which can represent applications of the invention. Numerous and varied other arrangements can be made by those skilled in the art without departing from the spirit and scope of the invention.

We claim:

1. An article comprising a dispersion compensator device, the compensator device comprising:
   a length of waveguide including a grating region having a plurality of spaced-apart grating elements;
   a body disposed adjacent the length of waveguide and attached to the waveguide proximal the grating region, the body having a gradient in its microstructure, dimensions, chemistry, or porosity to define a gradient-generating body, and
   a component for inducing an elastic strain in the gradient-generating body which thereby non-uniformly adjusts the spacings between the grating elements to alter the dispersion compensating characteristics of the waveguide.

2. The article of claim 1, in which the length of waveguide comprises a length of optical fiber and the gradient-generating body is integrally formed with the fiber.

3. The article of claim 2, in which the gradient-generating body is integrally formed with the length of waveguide by physical or chemical processing methods including sputtering, evaporation, chemical vapor deposition, electrodeposition, electroless deposition, dip-coating, or etching.

4. The article of claim 1, in which the grating is an optical Bragg grating.

5. The article of claim 1, in which the grating is a non-chirped grating before operation of the compensator, whereby when the component induces elastic strain in the body, the grating is altered to a chirped grating.

6. A dispersion compensating module comprising an optical circulator and a plurality of dispersion compensating gratings according to claim 5 which are independently tunable.

7. The article of claim 1, in which the grating is a uniformly or non-uniformly chirped grating and the inducement of elastic strain in the body increases or alters the chirping in the grating.

8. A dispersion compensating module comprising an optical circulator and at least one dispersion compensating grating according to claim 7.

9. The article of claim 1, in which the component for inducing the elastic strain comprises two magnetic components disposed alongside the waveguide, and further comprising a source for inducing a magnetic field and a fixed substrate, in which one magnetic component is secured to the body and the other magnetic component is secured to the fixed substrate, the mating poles of the magnetic components being aligned so that when the source induces a magnetic field, the magnetic components are attracted to or repelled from each other to induce the elastic strain in the body.

10. The article of claim 9, in which at least one magnetic component is comprised of a material whose magnetic properties are modifiable by a pulse magnetic field.

11. The article of claim 9, in which the body is secured to the fixed substrate which functions as a guiding rail for the body.

12. The article of claim 1, in which the elastic strain is latchable so that the dispersion compensating characteristics of the waveguide may be controllably altered without a continuous supply of power.

13. The article of claim 1, in which the component is attached to the body and coupled to a device for pulling the component in the direction opposite the body so that the elastic strain is induced by a mechanical pulling force.

14. A wavelength division multiplexed optical communications system comprising a source of multiple wavelength optical signal channels, an optical fiber trunk, a receiver for receiving multiple optical signal channels, a multiplexer/demultiplexer, and one or more dispersion compensating gratings according to claim 1.

15. The system of claim 14 further comprising a length of dispersion compensating fiber.

16. A dispersion compensating module comprising at least one tunable dispersion compensating grating according to claim 1 operating in transmission mode.

17. An optical amplifier comprising an input isolator, a first length of rare-earth doped fiber, a first pump for optical pumping the first length of fiber, a second length of rare-earth doped fiber, a second pump for optical pumping the second length of fiber, an output circulator, and a plurality of dispersion-compensating gratings according to claim 1.

18. An article comprising a dispersion compensator device, the compensator device comprising:
   a length of waveguide including a grating region having a plurality of spaced-apart grating elements;
   a body disposed adjacent the length of waveguide and attached to the waveguide proximal the grating region, the body having a gradient in its structure, dimensions, chemistry, or porosity to define a gradient-generating body;
   a fixed substrate having a point of attachment to at least one of the body or the length of waveguide; and
   a component for moving the body along the length of the waveguide in a longitudinal direction either away from or toward the fixed substrate, wherein when the component moves the body along the length of the waveguide, an elastic strain is induced in the body and a non-uniform strain is imposed on the length of the waveguide to non-uniformly adjust the spacings between the grating elements to alter the dispersion compensating characteristics of the waveguide.

19. The article of claim 18 in which the elastic strain is latchable so that the dispersion compensating characteristics of the waveguide may be controllably altered without a continuous power supply.

* * * * *